United States Patent [19]

Hoshi et al.

[11] Patent Number: 4,801,639

[45] Date of Patent: Jan. 31, 1989

[54] FLAME-RETARDANT OLEFINIC RESIN COMPOSITION

[75] Inventors: Kazuo Hoshi, Ibaraki; Yasuo Nakagawa, Nishinomiya, both of Japan

[73] Assignee: Sumitomo Bakelite Company Limited, Tokyo, Japan

[21] Appl. No.: 71,744

[22] Filed: Jul. 9, 1987

[30] Foreign Application Priority Data

Mar. 2, 1987 [JP] Japan .................................. 62-45200

[51] Int. Cl.[4] ........................... C08K 5/09; C08K 5/57; C08K 3/22
[52] U.S. Cl. ..................................... 524/112; 524/178; 524/297; 524/314; 524/321; 524/436; 524/437
[58] Field of Search ............... 524/287, 296, 297, 306, 524/321, 436, 437, 314, 112, 178, 405; 523/179; 521/92, 907; 525/69, 72

[56] References Cited

U.S. PATENT DOCUMENTS

| 3,201,363 | 8/1965 | Spurlin | 525/112 |
| 3,361,729 | 1/1968 | Takashima et al. | 524/112 |
| 3,696,069 | 10/1972 | Schrage et al. | 524/72 |
| 3,832,326 | 8/1974 | North et al. | 524/264 |
| 3,936,403 | 2/1976 | Sakaguchi et al. | 524/321 |
| 4,071,494 | 1/1978 | Gaylord | 525/193 |
| 4,353,817 | 10/1982 | Nakae et al. | 524/437 |
| 4,373,039 | 2/1983 | Mueller et al. | 524/437 |
| 4,420,341 | 12/1983 | Ferrigno | 524/321 |
| 4,558,094 | 12/1985 | Deguchi et al. | 525/72 |

*Primary Examiner*—Veronica P. Hoke
*Attorney, Agent, or Firm*—Browdy and Neimark

[57] ABSTRACT

A flame-retardant olefinic resin composition comprising (A) 100 parts by weight of a mixed resin consisting of an olefinic resin and a silane-grafted polymer obtained by grafting a silane to said olefinic resin, (B) 50 to 300 parts by weight of a hydrated metal compound, and (C) 0.1 to 30 parts by weight of a dicarboxylic acid or dicarboxylic acid anhydride derivative.

9 Claims, No Drawings

FLAME-RETARDANT OLEFINIC RESIN COMPOSITION

FIELD OF THE INVENTION

The present invention relates to flame-retardant olefinic resin compositions which generate no hazardous and corrosive gas of halogen type during burning due to fire outbreak and which are intended to be applied particularly to electric wires and cables.

BACKGROUND OF THE INVENTION

Imparting flame retardancy to polyolefin compositions which have been extensively used as an insulating material for electric wires, cables and electric appliances, has conventionally been achieved by adding a halogen compound and antimony trioxide to a polyolefin. However, the resulting compositions contain a halogen, and therefore generate, during burning, a halide gas which is harmful to the human body and corodes metals. Moreover, these compositions produce, during burning, a large amount of fumes, making visibility poor. This has imposed a remarkable restriction with respect to evacuation of people and fire fighting activity during fire.

Hence, it has recently become a strong desire for safety that these resin compositions produce no halogen-based gas upon burning. Under such a situation, hydrated metal compounds have come to draw attention as an inorganic flame retardant, because their fuming property and harmfulness are very low.

Resin compositions containing a large amount of magnesium hydroxide, aluminum hydroxide or the like for improving flame retardancy have been proposed in recent years. However, these resin compositions have the following drawbacks.

(1) Magnesium hydroxide reacts with moisture and carbon dioxide present in the air to produce magnesium carbonate. Accordingly, on the surface of a resin composition containing magnesium hydroxide, there appear white crystals of magnesium carbonate.

(2) Magnesium hydroxide and aluminum hydroxide have very low resistances to acids and alkalis. Therefore, when a resin composition containing magnesium hydroxide or aluminum hydroxide is in contact with an acid or an alkali, magnesium hydroxide or aluminum hydroxide readily dissolves in the acid or alkali at the surface of the resin composition. It dissolves in a large amount even in a weak acid having a pH of about 2 and, as a result, is liable to cause deterioration of the resin composition surface.

These drawbacks have delayed the practical applications of the resin compositions containing magnesium hydroxide, aluminum hydroxide or the like to electric wires and cables.

In connection with the present invention, Japanese Patent Application Nos. 129064/1986 and 138316/1986 state as follows.

A silane-grafted polymer causes crosslinking without requiring any catalyst. More specifically, hydroxyl groups (—OH) on the surface of a hydrated metal compound and silanol groups (→Si—OH) of a silane-grafted polymer cause a hydrolytic condensation reaction to form strong silanol linkages [—Si—O—$M_mO_n$ (M is a metal)], under the influences of (a) a small amount of water present on the surface of the hydrated metal compound and (b) the hydrated metal compound which acts similarly to an organic metal compound catalyst and in the presence of a frictional heat generated during kneading; in this reaction, no catalyst is required. The above two patent applications further state that said strong silanol linkages are effective in providing a resin composition with excellent shape retention at high temperatures, improved drip prevention during burning and improved mechanical properties (e.g., improved whitening on bending, and improved wear resistance). The patent applications also state in the Examples that the strong silanol linkages bring about improvements in mechanical properties, surface properties, thermal properties including heat deformation, and burning properties including oxygen index.

As olefinic resins, there have conventionally been available polyethylene, polypropylene, ethylene-alpha-olefin copolymers, ethylene-vinyl acetate copolymer, ethylene-ethyl acrylate copolymer, and polyolefins modified with an unsaturated dicarboxylic acid which are obtained, for example, by reacting a liquid hydrocarbon (e.g. a liquid polybutadiene) as a polymer skeleton with maleic anhydride in the presence of a radical-generating agent such as a peroxide. A number of olefinic resins are being marketed in Japan also. The addition of such a modified olefinic resin to other resins or metal powders for imparting an adhesive property to the latter has been tried and reported in many papers. On this point, a number of patent applications have been filed. The examples are Japanese Patent Publication Nos. 5788/1987 and 9135/1987.

As another example of maleic anhydride utilization, maleic anhydride has been added to thylene-alpha-olefin copolymers in the presence of a peroxide or the like to improve the latter's heat resistance and mechanical strength, as described in Japanese Patent Application Kokai (Laid-Open) Nos. 10151/1987 and 11745/1987. In this approach, the polar group of maleic anhydride is added to a non-polar olefinic resin to merely improve the latter's affinity with a filler and to finally improve the mechanical strength and heat resistance of the latter. Therefore, the purpose of this approach is different from that of an approach intended by the present invention wherein siloxane linkages are formed between a silane-grafted polymer and water of a hydrated metal compound and further complex salt linkages are formed between the hydrated metal compound and a dicarboxylic acid or dicarboxylic acid anhydride derivative.

SUMMARY OF THE INVENTION

The present invention is intended to provide an olefinic resin composition capable of preventing the deterioration and significant reduction in chemical resistance occurring at the surfaces of the above mentioned resins in various environmental tests or in practical applications, when they contain a hydrated metal compound as a flame retardant.

According to the present invention, there is provided a flame-retardant olefinic resin composition comprising (A) 100 parts by weight of a mixed resin consisting of an olefinic resin and a silane-grafted polymer obtained by grafting a silane to said olefinic resin, (B) 50 to 300 parts by weight of a hydrated metal compound, and (C) 0.1 to 30 parts by weight of a dicarboxylic acid or dicarboxylic acid anhydride derivative.

The olefinic resin composition of the present invention is characterized in that it can prevent the surface deterioration and surface attack by chemicals in electric wires and cables when the present composition is used for these wires and cables, because it comprises a silane-grafted polymer and a dicarboxylic acid or dicarboxylic acid anhydride derivative.

In other words, the present invention provides a resin composition capable of preventing the surface deterioration and severe surface attack by chemicals which occur with conventional resin compositions containing a hydrated metal compound as a flame retardant.

The olefinic resin used in the present invention includes low density polyethylene, medium density polyethylene, high density polyethylene, ethylene-alpha-olefin copolymers, ethylene-vinyl acetate copolymer, ethylene-ethyl acrylate copolymer, ethylene-methyl methacrylate copolymer, ethylene-propylene rubber, ethylene-propylene-diene rubbers, etc. As the alpha-olefin, there can be mentioned those having 3 to 12 carbon atoms, such as propylene, butene-1, pentene-1, hexene-1, heptene-1, octene-1, 4-methylpentene-1, 4-methylhexene-1, 4,4-dimethylpentene-1, nonene-1, decene-1, undecene-1, dodecene-1 and the like. Of these alpha-olefins, most preferable are butene-1, pentene-1, hexene-1, heptene-1 and 4-methylpentene-1.

The silane-grafted polymer is obtained by reacting the olefinic resin with an organic silane represented by the general formula $RR'SiY_2$ (wherein R is a monovalent olefinically unsaturated hydrocarbon group; Y is a hydrolyzable organic group; and R' is a monovalent hydrocarbon group other than unsaturated aliphatic hydrocarbon groups or is same as Y) in the presence of a free-radical-generating compound. This reaction is conducted according to a known method described in Japanese Patent Publication No. 24373/1982, Japanese Patent Publication No. 1711/1973, Japanese Patent Application Kokai (Laid-Open) No. 24342/1975, etc. In a specific example, a polyolefin resin is reacted with vinyltrimethoxysilane in the presence of an organic peroxide [e.g. DCP (dicumyl peroxide)] having a strong polymerization-initiating action, whereby a silane-grafted polymer is obtained.

The amount of the silane-grafted polymer used is preferably at least 2% by weight in the mixed resin (A). When the amount is less than 2% by weight, the resulting resin composition shows no improvement in shape retention at high temperatures and drip prevention during burning.

The crosslinking degree of the silane-grafted polymer is preferred to be 20 to 80% by weight in terms of a gel fraction which is defined as a xylene insoluble. When the gel fraction is less than 20% by weight, the resulting resin composition is low in shape retention at high temperatures and drip prevention during burning. When the gel fraction is more than 80% by weight, the resulting resin composition shows poor moldability.

The hydrated metal compound used in the present invention is a compound having a decomposition-starting temperature of 150° to 450° C. and represented by the general formula $M_mO_n \cdot XH_2O$ (wherein M is a metal; m and n are each an integer of 1 or more determined by the valency of the metal; and X is the number of molecules of bound water) or a double salt containing said compound.

Specific examples of the hydrated metal compound are aluminum hydroxide [$Al_2O_3 \cdot 3H_2O$ or $Al(OH)_3$], magnesium hydroxide [$MgO \cdot H_2O$ or $Mg(OH)_2$], calcium hydroxide [$CaO \cdot H_2O$ or $Ca(OH)_2$], barium hydroxide [$BaO \cdot H_2O$ or $BaO \cdot 9H_2O$], zirconium oxide hydrate ($ZrO \cdot nH_2O$), tin oxide hydrate ($SnO \cdot H_2O$), basic magnesium carbonate [$3MgCO_3 \cdot Mg(OH)_2 \cdot 3H_2O$], hydrotalcite ($6MgO \cdot Al_2O_3 \cdot H_2O$), dawsonite ($Na_2CO_3 \cdot Al_2O_3 \cdot nH_2O$), borax ($Na_2O \cdot B_2O_5 \cdot 5H_2O$) and zinc borate ($ZnB_4O_7 \cdot 2H_2O$).

When the hydrated metal compound is added in an amount less than 50 parts by weight, the resulting resin composition is difficult to have desired flame retardancy. When the hydrated metal compound is added in an amount more than 300 parts by weight, the resulting resin composition shows poor mechanical properties (e.g. low tensile strength) and poor extrudability.

As the dicarboxylic acid derivative, there can be mentioned saturated aliphatic dicarboxylic acids such as oxalic acid, malonic acid, succinic acid, glutaric acid, adipic acid, pimelic acid, suberic acid, azelaic acid, sebacic acid and the like; unsaturated aliphatic dicarboxylic acids such as fumaric acid, maleic acid and the like; carbocylic dicarboxylic acids such as phthalic acid, isophthalic acid, terephthalic acid and the like; and salts and esters of these dicarboxylic acids, such as dibutyltin maleate, dioctyltin maleate (these maleates are obtained by substituting the hydrogen ions of the carboxyl groups of maleic acid with another cation), diethyl malonate and the like.

The dicarboxylic acid or dicarboxylic acid anhydride derivative of the present invention further includes all modified polymers obtained by modifying a polymer with one of the above mentioned dicarboxylic acid derivatives, such as (a) ternary copolymer of ethylene, maleic acid (or its anhydride) and ethyl acrylate (or acrylic acid), (b) maleic anhydride-modified polyolefin resins obtained by grafting a polyolefin resin with maleic anhydride in the presence of a peroxide, (c) maleic acid (or maleic anhydride)-modified polybutadiene obtained by adding maleic acid (or maleic anhydride) to a liquid polybitadiene having a molecular weight of 5000 or less, and (d) esterification products of maleic acid (or maleic anhydride)-modified polybutadiene, and furthermore includes hydrogenation produts of said modified polymers obtained by subjecting such a modified polymer to hydrogenation to saturate the unsaturated bonds of the modified polymer.

The dicarboxylic acid anhydride derivative further includes mixed anhydrides between two different carboxylic acids such as acetic-benzoic anhydride in addition to structurally possible anhydrides of these dicarboxylic acids.

When the amount of the dicarboxylic acid or dicarboxylic acid anhydride derivative is less than 0.1 part by weight, the addition effect is too low. When the amount is more than 30 parts by weight, the reaction between the derivative and the hydrated metal compound takes place excessively and the composition shows poor extrudability and the extrudate shows deteriorated appearance.

The flame-retardant olefinic resin composition of the present invention can further contain, if necessary, various additives conventionally used, such as antioxidant, neutralizing agent, UV absorber, antistatic agent, pigment, dispersing agent, lubricant, thickener, foaming agent, metal deterioration inhibitor, fungicide, flow control agent, flame retardant of phosphorus or phosphine derivative type, other inorganic fillers, crosslinking agent, crosslinking aid and the like and furthermore other resins. The present composition can be subjected to crosslinking by electron rays.

In producing the olefinic resin composition of the present invention, the following reactions take place by kneading a system containing three components, namely, the silane-grafted polymer, the hydrated metal compound and the dicarboxylic acid or dicarboxylic acid anhydride derivative.

(1) The silane-grafted polymer causes crosslinking without requiring any catalyst. More specifically, hydroxyl groups (—OH) on the surface of the hydrated metal compound and silanol groups →Si—OH) of the silane-grafted polymer cause a hydrolytic condensation reaction to form strong siloxane linkages [—Si—O—M-$_mO_n$ (M is a metal)], under the influences of (a) a small amount of water present on the surface of the hydrated metal compound and (b) the hydrated metal compound which acts similarly to an organic metal compound catalyst and in the presence of a frictional heat generated during kneading; in this reaction, no catalyst is required.

(2) The dicarboxylic acid derivative reacts with the metal ion of the hydrated metal compound to form a complex salt.

(3) The dicarboxylic acid anhydride derivative is subjected to ring opening during kneading with heating, by the water of the hydrated metal compound and, simultaneously therewith, reacts with the hydrated metal compound to form a complex salt.

As mentioned above, there are formed (a) siloxane linkages between the silane-grafted polymer and the hydrated metal compound and (b) complex salt linkages between the dicarboxylic acid or dicarboxylic acid anhydride derivative and the hydrated metal compound. The synergistic effect of these two types of linkages can remarkably reduce the surface deterioration and severe surface attack by chemicals which occur at conventional flame-retardant resin compositions using a hydrated metal compound. Severe requirements for flame-retardant resin compositions can be met only by the synergistic effect of the two types of linkages and can never be met by either one of the two linkages.

In producing the present composition, there occur independently the two reactions, that is, one between the silane-grafted polymer and the hydrated metal compound and the other between the hydrated metal compound and the dicarboxylic acid or dicarboxylic acid anhydride derivative. Therefore, in compounding the three components of the present composition, namely, (A) 100 parts by weight of a mixed resin consisting of an olefinic resin and a silane-grafted polymer obtained by grafting a silane to said olefinic resin,
(B) 50 to 300 parts by weight of a hydrated metal compound, and
(C) 0.1 to 30 parts by weight of a dicarboxylic acid or dicarboxylic acid anhydride derivative, any of the following blending sequences can be adopted.

(1) The components (A), (B) and (C) are kneaded together.

(2) The components (A) and (B) are kneaded first; then, the component (C) is added; and all the components are kneaded.

(3) The components (B) and (C) are kneaded or the component (B) is subjected to a surface treatment by the component (C); then, the componnnt (A) is added; and all the components are kneaded.

Depending upon the state (solid or liquid) of the component (C), one of the above blending sequences (1) to (3) may be selected appropriately. This is one of the advantages of the present invention.

The present invention has a combustion-controlling effect quite different from that of the prior art using carbon powders and accordingly can exhibit the combustion-controlling effect irrespective of various pigments which may be added to the present composition for easier identification in use. Hence, the present composition can be colored in any desired color depending on uses.

DETAILED DESCRIPTION OF THE INVENTION

The present invention is explained specifically with reference to Examples and Comparative Examples.

Experiment I (Examples 1 to 7 and Comparative Examples 1 to 3)

First, two silane-grafted olefinic resins (two silane-grafted polymers) were prepared according to the formulations shown in Table 1, using the following procedure. Dicumyl peroxide (DCP) was dissolved in vinyltrimethoxysilane. The solution was independently mixed with two low-crystalline polyethylenes, namely, (1) an ethylene-butene-1 copolymer and (2) an ethylene-ethyl acrylate copolymer. Each mixture was kneaded and then extruded at 150° to 200° C. using a single-screw extruder of 50 mm$\phi$ to obtain silane-grafted polymers A and B in a pellet form. Each polymer was placed in an aluminum-laminated bag and the bag was sealed to prevent the incoming of external moisture. The polymer was taken out by each necessary amount whenever required.

TABLE 1

Formulations used in production of silane-grafted polymers (silane-grafted olefinic resins)

| Materials | Silane-grafted olefinic resins | |
| --- | --- | --- |
| | A | B |
| (1) D 9052 | 100 | — |
| (2) A 2150 | — | 100 |
| DCP | 0.2 | 0.2 |
| Vinyltrimethoxysilane | 3 | 3 |
| Gel fraction, % by weight* | 57 | 60 |

(1) Softex, a VLDPE manufactured by Nippon Petrochemicals Co., Ltd.
(2) Rexlon, an EEA copolymer manufactured by Nippon Petrochemicals Co., Ltd.
*Insoluble (% by weight) after immersion in xylene at 120° C. for 20 hours.

Next, various components shown in Table 2 were mixed together in a container. Each of the resulting mixture was then kneaded in a Banbury roll and pelletized.

The pellets were roll-pressed to obtain a pressed sheet. From each sheet, various test pieces were prepared. Some of these test pieces were immersed in water; carbon dioxide gas was blown thereinto; and the surface whitening due to formation of magnesium carbonate was examined. Using other test pieces, there were also examined their weight change by 10% sulfuric acid or 3% aqueous sodium hydroxide solution, their oxygen index as a measure of flame retardancy, and their extrudability as a measure of processability, using an extruder.

The results are shown in Table 2. As seen from Table 2, systems using a combination of a silane-grafted polymer and a dicarboxylic acid or dicarboxylic acid anhydride derivative show remarkable improvements in whitening and resistances to sulfuric acid and sodium hydroxide.

TABLE 2

| Materials in composition | Comparative Example 1 | 2 | 3 | Examples 1 | 2 | 3 | 4 | 5 | 6 | 7 |
|---|---|---|---|---|---|---|---|---|---|---|
| (1) D 9052 | 100 | | | | | 50 | | | 60 | 30 |
| (2) A 2150 | | 100 | 70 | 70 | 50 | | | | | 30 |
| (3) EV-270 | | | | | | | | | 20 | 20 |
| Silane-grafted olefinic resin A | | | | | | 50 | 100 | | 20 | 20 |
| Silane-grafted olefinic resin B | | | 30 | 30 | 50 | | | 100 | | |
| (4) Magnesium hydroxide | 100 | 200 | 200 | 200 | 150 | 150 | 150 | 250 | 100 | 150 |
| (5) Stan BM [N] | | | | 5 | | | 5 | | | |
| (6) M-3000-20 | | 5 | | | 10 | | | 10 | | 5 |
| (7) FX 8000 | | | | | | 10 | | | | |
| (8) Isoban 04 | | | | | | | 10 | | 25 | |
| (9) Lubricant and stabilizer | 1.6 | 1.6 | 1.6 | 1.6 | 1.6 | 1.6 | 1.6 | 1.6 | 1.6 | 1.6 |
| (10) Pigment | Black | Black | Black | Black | Not used | Not used | Not used | Not used | Black | Black |
| Evaluated characteristics | | | | | | | | | | |
| (11) Degree of whitening | Unacceptable | Unacceptable | Acceptable | Excellent | Excellent | Excellent | Excellent | Excellent | Excellent | Excellent |
| (12) Weight change by 10% sulfuric acid, % by weight | −32.0 | −23.5 | −18.2 | −5.4 | −2.3 | −1.8 | −2.1 | −1.2 | −0.5 | −1.6 |
| (13) Weight change by 3% sodium hydroxide, % by weight | −3.0 | −4.4 | −1.3 | −0.2 | −0.3 | −0.3 | −0.2 | −0.2 | −0.1 | −0.2 |
| (14) Oxygen index | 26 | 33 | 34 | 35 | 31 | 31 | 31 | 36 | 26 | 32 |
| (15) Extrudability | Good | Excellent | Excellent | Excellent | Excellent | Excellent | Excellent | Excellent | Good | Good |
| Overall rating | Unacceptable | Unacceptable | Unacceptable | Good | Excellent | Excellent | Excellent | Excellent | Good | Good |

(3) An ethylene-vinyl acetate copolymer manufactured by Mitsui Du Pont Polychemical K.K.
(4) KISUMA 5B manufactured by Kyowa Kagaku K.K.
(5) Dibutyltin maleate manufactured by Sankyo Yuki Gosei K.K.
(6) A liquid polybutadiene modified with maleic anhydride, manufactured by Nippon Petrochemicals Co., Ltd.
(7) BONDINE, an ethylene-maleic anhydride-acrylic acid copolymer resin manufactured by Sumitomo Chemical Co., Ltd.
(8) An isobutylene-maleic anhydride copolymer resin manufactured by KURARAY CO., LTD.
(9) Sanwax 171P manufactured by SANYO CHEMICAL INDUSTRY LTD. 1.0 Irganox 1076 manufactured by Ciba Geigy K.K. 0.3 Sumilizer WXR manufactured by Sumitomo Chemical Co., Ltd. 0.3
(10) VALCAN 9A-32 3.0 (in case of a black pigment)
(11) Each roll-pressed sheet was cut into a test piece of 5 cm × 5 cm × 1 mm (thickness). The test piece was immersed in one liter of distilled water. Thereinto was blown carbon dioxide gas at a rate of 100 ml/min for 48 hours. Then, the test piece was taken out and its degree of whitening due to the formation of magnesium carbonate crystal was observed visually.
(12) The weight change of a test piece when immersed in 10% (by weight) sulfuric acid at 50° C. for 7 days was measured. As the test piece, there was used a JIS No. 3 dumbbell having a thickness of 1 mm.
(13) The weight change of a test piece when immersed in 3% (by weight) sodium hydroxide at 50° C. for 7 days was measured. As the test piece, there was useda JIS No. 3 dumbbell having a thickness of 1 mm.
(14) Measured according to JIS K 7201.
(15) A single-screw extruder was used. 50 mmØ; 150–160–170–180° C.; L/D 25; CR 3.5; extruded tube inside diameter 15Ø; outside diameter 18Ø.
Overall rating: Excellent > Good > Acceptable > Unacceptable Experiment II (Examples 8 to 14 and Comparative Examples 4 to 6)

Using the formulations shown in Table 3, the same procedure as in Experiment I was conducted.

The results are shown in Table 3. As seen from Table 3, systems using a combination of the silane-grafted polymer A and a dicarboxylic acid or dicarboxylic acid anhydride derivative show remarkable improvements in whitening and resistances to sulfuric acid and sodium hydroxide.

TABLE 3

| Materials in composition | Comparative Examples 4 | 5 | 6 | Examples 8 | 9 | 10 | 11 | 12 | 13 | 14 |
|---|---|---|---|---|---|---|---|---|---|---|
| (1) D 9052 | 50 | | | 50 | | 70 | | | 50 | |
| (2) A 2150 | | 50 | 60 | | 50 | | 50 | | | 50 |
| (16) EP 07 P | 40 | | 20 | | | 20 | 20 | | 20 | 20 |
| Silane-grafted olefinic resin A | 10 | 50 | 20 | 50 | 50 | 10 | 30 | 100 | 30 | 30 |
| (17) Aluminum hydroxide | 200 | | | 100 | 200 | 200 | 200 | | | |
| (4) Magnesium hydroxide | | 100 | 350 | | | | | 100 | 150 | 250 |
| (18) RIKACID MH-700 | 50 | | | 5 | 10 | | | 5 | | |
| (19) Admer NF 300 | | | | | | | 5 | | 5 | |
| (20) N Polymer L 6101 | | | 30 | | 20 | | | | 10 | |
| (21) R 45 MA | | 0.06 | | | | | 5 | | | 25 |
| (9) Lubricant and stabilizer | 1.6 | 1.6 | 1.6 | 1.6 | 1.6 | 1.6 | 1.6 | 1.6 | 1.6 | 1.6 |
| (10) Pigment | Black | Black | Not used | Black | Black | Not used | Not used | Black | Not used | Not used |
| Evaluated characteristics | | | | | | | | | | |
| (11) Degree of whitening (immersion for 20 hours) | Excellent* | Acceptable | Good | Excellent* | Excellent* | Excellent* | Excellent* | Excellent | Excellent | Excellent |
| (12) Weight change by 10% sulfuric acid, % by weight | −2.1 | −19.2 | −7.9 | −0.7 | −1.6 | −1.8 | −1.2 | −0.5 | −0.9 | −0.4 |
| (13) Weight change by 3% sodium hydroxide, | 1.0 | 6.2 | 5.3 | −0.1 | −0.2 | −0.1 | −0.2 | 0 | −0.2 | 0 |

TABLE 3-continued

|  | Comparative Examples | | | Examples | | | | | | |
|---|---|---|---|---|---|---|---|---|---|---|
| Materials in composition | 4 | 5 | 6 | 8 | 9 | 10 | 11 | 12 | 13 | 14 |
| % by weight | | | | | | | | | | |
| (14) Oxygen index | 19 | 23 | 37 | 24 | 31 | 32 | 33 | 25 | 30 | 37 |
| (15) Extrudability | Excellent | Excellent | Unacceptable | Excellent | Excellent | Excellent | Excellent | Excellent | Excellent | Excellent |
| Overall rating | Unacceptable | Unacceptable | Unacceptable | Excellent | Excellent | Excellent | Excellent | Excellent | Excellent | Excellent |

*In Comparative Example 4 and Examples 8, 9, 10 and 11, aluminum hydroxide was used as a hydrated metal compound. Therefore, after the blowing of carbon dioxide, neither dissolution of aluminum hydroxide nor formation of magnesium carbonate occured. As a result, no whitening appeared.
(16) An ethylene-propylene rubber manufactured by Japan Synthetic Rubber Co., Ltd.
(17) Higilite H 42M manufactured by Showa Denko K.K.
(18) 4-Methylhexahydrophthalic anhydride manufactured by Shin Nihon Rika K.K.
(19) A maleic anhydride-grafted polyolefin (an adhesive resin) manufactured by Mitsui Petrochemical Industries, Ltd. MFI 1.3; density 0.94; LLDPE-based.
(20) A maleic anhydride-grafted polyolefin (an adhesive resin) manufactured by Nippon Petrochemicals Co., Ltd. MFI 0.3; density 0.92; LLDPE-based.
(21) A liquid polybutene modified with maleic acid, manufactured by Idemitsu Sekiyu Kagaku K.K.
Overall rating: Excellent > Good > Acceptable > Unacceptable

We claim:

1. A flame-retardant olefinic resin composition comprising
(A) 100 parts by weight of a mixed resin consisting of an olefinic resin and a silane-grafted polymer obtained by grafting a silane to said olefinic resin, the amount of the silane-grafted polymer being at least 2% by weight in the mixed resin,
(b) 50 to 300 parts by weight of a hydrated metal compound, and
(c) 0.1 to 30 parts by weight of a dicarboxylic acid or dicarboxylic acid anhydride derivative selected from the group consisting of carbocyclic dicarboxylic acids consisting of phthalic acid, isophthalic acid and terephthalic acid and the anhydrides thereof; dibutyltin maleate and dioctyltin maleate; ternary copolymers of ethylene, maleic acid or the anhydride thereof and ethyl acrylate or acrylic acid; polyolefin resins modified with maleic acid or the anhydride thereof; and polybutadiene modified with maleic acid or the anhydride thereof.

2. A flame-retardant olefinic resin composition according to claim 1, wherein the olefinic resin is selected from the group consisting of low density polyethylene, medium density polyethylene, high density polyethylene, ethylene-alpha-olefin copolymers, ethylene-vinyl acetate copolymer, ethylene-ethyl acrylate copolymer, ethylene-methyl methacrylate copolymer, ethylene-propylene rubber, and ethylene-propylene-diene rubbers.

3. A flame-retardant olefinic resin composition according to claim 1, wherein the silane-grafted polymer is obtained by reacting the olefinic resin with an organic silane rpresented by the general formula RR'SiY$_2$ wherein R is a monovalent olefinically unsaturated hydrocarbon group; Y is a hydrolyzable organic group; and R' is a monovalent hydrocarbon group other than unsaturated aliphatic hydrocarbon groups or is same as Y in the presence of a free-radical-generating compound.

4. A flame-retardant olefinic resin composition according to claim 1, wherein the hydrated metal compound is a compound having a decomposition-starting temperature of 150° to 450° C. and represented by the general formula $M_mO_n \cdot XH_2O$ wherein M is a metal; m and n are each an integer of 1 or more determined by the valency of the metal; and X is the number of molecules of bound water or a double salt containing said compound.

5. A flame-retardant olefinic resin composition according to claim 4, wherein the M is selected from the metals of groups IA, IIA, IIB, IIIA, IVA and IVB of the periodic table.

6. A flame-retardant olefinic resin composition according to claim 5, wherein the M is selected from the metals of group IIA of the periodic table.

7. A flame-retardant olefinic resin composition according to claim 5, wherein the M is selected from the metals of group IIIA of the periodic table.

8. A flame-retardant olefinic resin composition according to claim 4, wherein the hydrated metal compound is magnesium oxide monohydrate.

9. A flame-retardant olefinic resin composition according to claim 4, wherein the hydrated metal compound is aluminum oxide trihydrate.

* * * * *